United States Patent [19]

Haaf

[11] Patent Number: 5,095,060

[45] Date of Patent: Mar. 10, 1992

[54] BLENDS OF POLYPHENYLENE ETHER RESIN, A POLYETHERIMIDE SILOXANE COPOLYMER AND PENTAERYTHRITOL TETRABENZOATE

[75] Inventor: William R. Haaf, Voorheesville, N.Y.

[73] Assignee: General Electric Company, Selkirk, N.Y.

[21] Appl. No.: 629,950

[22] Filed: Dec. 19, 1990

[51] Int. Cl.$^5$ .............................................. C08K 5/10
[52] U.S. Cl. ..................................... 524/293; 525/397
[58] Field of Search ...................... 524/293; 525/397

[56] References Cited

U.S. PATENT DOCUMENTS

| | | | |
|---|---|---|---|
| 3,186,961 | 6/1965 | Sears | 524/293 |
| 4,348,497 | 9/1982 | Berghman | 524/293 |
| 4,431,779 | 3/1984 | White et al. | 525/397 |
| 4,690,997 | 11/1987 | Cella et al. | 528/26 |
| 4,808,686 | 6/1989 | Cella et al. | 528/27 |
| 4,873,287 | 5/1989 | Holub et al. | 525/397 |

FOREIGN PATENT DOCUMENTS 1353501  2/1974  United Kingdom .

Primary Examiner—Veronica P. Hoke
Attorney, Agent, or Firm—Lowe, Price, LeBlanc & Becker

[57] ABSTRACT

Blend compositions comprise a polyphenylene ether resin, a polyetherimide siloxane copolymer and pentaerythritol tetrabenzoate. The polyetherimide siloxane copolymer is preferably included in an amount sufficient to provide the compositions with improved flame retardant properties while the pentaerythritol tetrabenzoate is preferably included in an amount sufficient to lower the melt viscosity of the blend compositions. The compositions may further include an impact-modifying rubber compound, preferably a block copolymer of a vinyl aromatic hydrocarbon and an alkene or post-hydrogenated diene hydrocarbon.

15 Claims, No Drawings

BLENDS OF POLYPHENYLENE ETHER RESIN, A POLYETHERIMIDE SILOXANE COPOLYMER AND PENTAERYTHRITOL TETRABENZOATE

FIELD OF THE INVENTION

The present invention relates to blend compositions comprising a polyphenylene ether resin and a polyetherimide siloxane copolymer, which compositions exhibit an advantageous combination of properties including flame retardancy and good processability as indicated by melt viscosity.

BACKGROUND OF THE INVENTION

Polyphenylene ether resins are well known in the art and exhibit a desirable combination of chemical, physical and electrical properties over a wide temperature range. This combination of properties renders polyphenylene ether resins suitable for use in a broad range of applications. Often times, polyphenylene ether resins are blended with other resins in order to improve their chemical resistance, their processability and/or other properties and to increase their fields of application.

For example, the White et al U.S. Pat. No. 4,431,779 discloses blend compositions comprising a polyphenylene ether and a polyetherimide. The blends are disclosed as disclosing good impact strength as well as good mechanical properties. The Holub et al U.S. Pat. No. 4,873,287 discloses blend compositions comprising a polyphenylene ether, a polyetherimide and a block copolymer of a vinyl aromatic compound and an alkene compound. The blends are disclosed as exhibiting high glass transition temperatures and excellent flexural properties.

Often times, phosphorus and/or halogen containing materials are added to polyphenylene ether resins in order to improve the fire retardant properties of the resins. However, the use of such phosphorus and/or halogen containing materials can be disadvantageous for several reasons. For example, halogen-containing materials can sometimes react during resin processing to form corrosive by-products. The copending Rock application Ser. No. 07/563,750 filed Aug. 3, 1990 discloses blend compositions comprising a polyphenylene ether and a polyetherimide siloxane copolymer. The compositions are disclosed as exhibiting low flammability, and are advantageous in that they do not require phosphorus and/or halogen containing materials. Flame retardant silicone-polyimides are also disclosed in the Cella et al U.S. Pat. Nos. 4,690,997 and 4,808,686.

Owing to the increasing demand for use of polyphenylene ether resin compositions in various applications, there is a continuing need to provide such compositions having improved combinations of properties.

SUMMARY OF THE INVENTION

Accordingly, it is an object of the present invention to provide improved polyphenylene ether resin compositions. It is a further object of the invention to provide polyphenylene ether resin compositions which exhibit good flame retardant properties. It is another object of the invention to provide polyphenylene ether resin compositions which exhibit good flame retardant properties and good processability, particularly as indicated by melt viscosity.

These and additional objects are provided by the blend compositions according to the present invention which comprise a polyphenylene ether resin, a polyetherimide siloxane copolymer and pentaerythritol tetrabenzoate. The present Inventor has discovered that the addition of pentaerythritol tetrabenzoate to compositions comprising a polyphenylene ether resin and a polyetherimide siloxane copolymer provides the compositions with a reduced melt viscosity and therefore improved processability, while retaining the good flame retardant properties provided by the polyetherimide siloxane copolymer. In a preferred embodiment, the blend compositions according to the present invention contain a block copolymer of a vinyl aromatic hydrocarbon and an alkene hydrocarbon compound in an amount sufficient to improve the impact strength of the blend compositions.

These and additional objects and advantages provided by the compositions of the present invention will be more fully apparent in view of the following detailed description.

DETAILED DESCRIPTION

The blend compositions according to the present invention comprise a polyphenylene ether resin, a polyetherimide siloxane copolymer and pentaerythritol tetrabenzoate. The compositions exhibit an advantageous combination of properties including good processability, particularly as indicated by lowered melt viscosity, and good flame retardant properties.

Polyphenylene ether resins are well known in the art and are generally of the formula

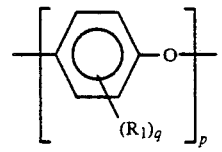

wherein each $R_1$ is individually selected from the group consisting of halogen, alkyl, aryl and alkoxy, q is from 0 to 4 and p is at least 20. When $R_1$ comprises an alkyl group, an aryl group or an alkoxy group, the group suitably contains from about 1 to about 12 carbon atoms.

The polyphenylene ether polymers suitable for use in the present invention are well known in the art and may be prepared by any of a number of processes known in the art from corresponding phenols or reactive derivatives thereof. Examples of polyphenylene ether resins and methods for their production are set forth in the Hay U.S. Pat. Nos. 3,306,874 and 3,306,875, in the Stamatoff U.S. Pat. Nos. 3,257,357 and 3,257,358, and in U.S. Pat. No. 4,935,472 of S. B. Brown et al, all of which are incorporated herein by reference. Throughout the specification and claims the term "polyphenylene ether resin" includes unsubstituted polyphenylene ether polymers, substituted polyphenylene ether polymers, polyphenylene ether copolymers and blends thereof.

Preferred polyphenylene ether polymers adapted for use in the present invention include, but are not limited to, poly(2,6-dimethyl-1,4-phenylene)ether; poly(2,3,6-trimethyl-1,4-phenylene) ether; poly(2,6-diethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4-phenylene)ether; poly(2,6-dimethoxy-1,4- phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene) ether; poly(2,6-dibromo-1,4-phenylene)ether; poly(3-bromo-2,6-dimethyl-1,4-phenylene)ether, copolymers thereof and mixtures thereof, and the like. Particularly preferred polyphenylene ether polymers for use in the compositions of the present invention include poly(2,6-dimethyl-1,4-phenylene) ether, poly(2,3,6-trimethyl-1,4-phenylene)ether, blends of these polymers and copolymers including units of 2,3,6-trimethyl-1,4-phenylene ether and units of 2,6-dimethyl-1,4-phenylene ether. Examples of such polymers and copolymers are also set forth in U.S. Pat. No. 4,806,297.

The polyetherimide siloxane copolymer which is included in the blend compositions of the present invention preferably contains repeating units of the formula

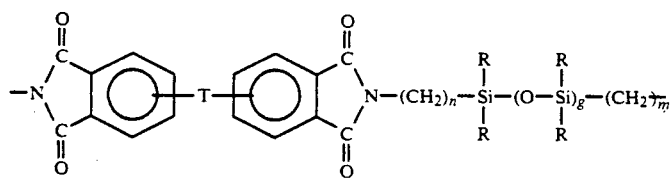

and of the formula

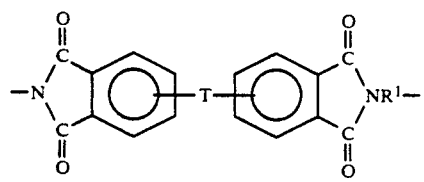

wherein T is —O— or a group of the formula —O—Z—O— wherein the divalent bonds of the —O— or the —O—Z—O— group are in the 3,3', 4,3', or the 4,4' positions; Z is a divalent radical selected from the group consisting of

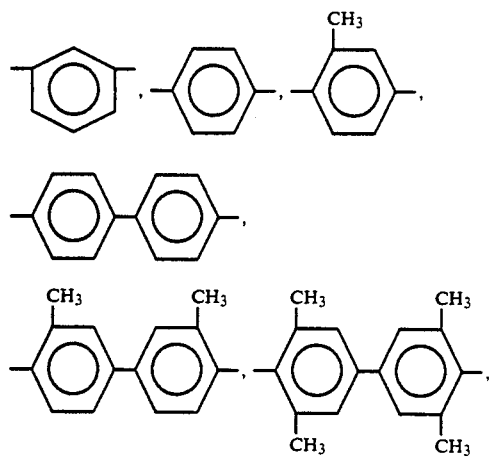

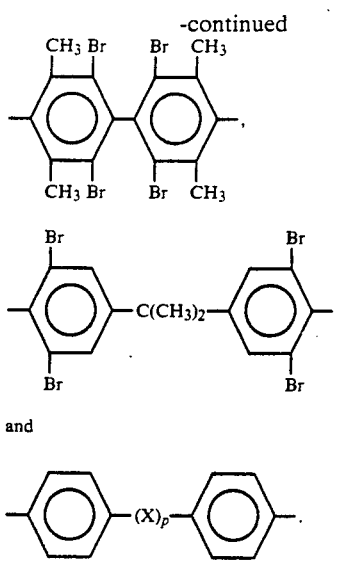

and

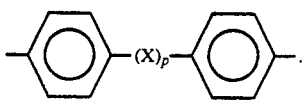

wherein X is a member selected from the group consisting of divalent radicals of the formulas

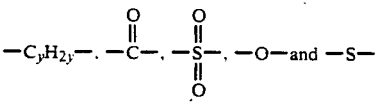

wherein y is an integer from 1 to about 5, and p is 0 or 1; n and m independently are integers from 1 to about 10; g is an integer from 1 to about 40; R is a $C_1$-$C_{14}$ monovalent hydrocarbon radical or a substituted $C_1$-$C_{14}$ monovalent hydrocarbon radical; and $R^1$ is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula

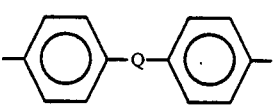

where Q is a member selected from the group consisting of

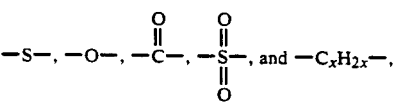

and x is an integer from 1 to about 5. In a preferred embodiment of formula (I), each R is a methyl group, and n and m are each three. Suitable polyetherimide-siloxane copolmers and their methods are preparation are disclosed in the Cella et al U. S. Pat. Nos. 4,690,997 and 4,808,686 and the copending Rock application Ser. No. 07/563,750 filed Aug. 3, 1990, the disclosures of which are incorporated herein by reference.

The polyetherimide-siloxane copolymers included in the blend compositions of the present invention can be prepared by methods well known in the art, for example, by the reaction of an aromatic bis(ether anhydride) of the formula

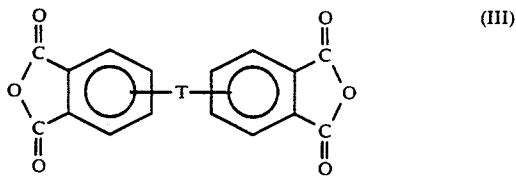

with at least one organic diamine of the formula

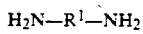

and at least one amine-terminated organosiloxane of the formula

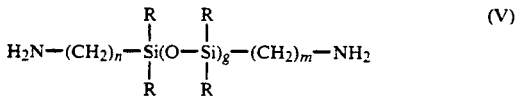

wherein n, m, g, T, R and Rhu 1 are defined as described above.

In preparing the polyetherimide-siloxane copolymers included in the blend compositions of the present invention from an aromatic bis(ether anhydride), at least one organic diamine and at least one amine-terminated organosiloxane as described above, suitable bis(ether anhydride)s include, but are not limited to, the following:

1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride;
1,4-bis(3,4-dicarboxyphenoxy)benzene dianhydride;
4,4'-bis(phthalic anhydride)ether;
2,2-bis[4-(3,4-dicarboxyphenoxy)phenyl]propane dianhydride;
4,4'-bis(3,4-dicarboxyphenoxy)dipenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
2,2-bis([4-2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
4-(2,3-dicarboxyphenoxy)-4'-(3,4-dicarboxyphenoxy) diphenyl-2,2-propane dianhydride;
4-(2,3-dicarboxyphenoxy)-4'-(3,4-dicarboxyphenoxy) diphenyl ether dianhydride;
2,3-dicarboxyphenoxy)-4'-(3,4-dicarboxyphenoxy) diphenyl sulfide dianhydride;
2,3-dicarboxyphenoxy)-4'-(3,4-dicarboxyphenoxy) benzophenone dianhydride;
2,3-dicarboxyphenoxy)-4'-(3,4-dicarboxyphenoxy) diphenyl sulfone dianhydride; and mixtures thereof.

Some of these aromatic bis(ether anhydride)s are disclosed in the Heath et al U.S. Pat. No. 3,972,902. As described therein, the bis(ether anhydride)s can be prepared by the hydrolysis, followed by dehydration, of the reaction product of a nitro-substituted phenyl dinitrile with a metal salt of dihydric phenol compound in the presence of a dipolar, aprotic solvent. Additional aromatic bis(ether anhydride)s also suitable for preparing the polyetherimide siloxane copolymer are disclosed by Koton et al. (Institute of Heteroorganic Compounds, Academy of Sciences, U.S.S.R.), U.S.S.R. Patent No. 257,010 dated Nov. 11, 1969, and by Koton et al, *Zh. Orc. Khin.* 4(5), 774 (1968).

Organic diamines suitable for use in preparing the polyetherimide siloxane copolymer include, but are not limited to, the following:

m-phenylenediamine;
p-phenylenediamine;
4,4'-diaminodiphenylpropane;
4,4'-diaminodiphenylmethane (commonly named 4,4'-methylenedianiline);
4,4'-diaminodiphenyl sulfide;
4,4'-diaminodiphen-yl sulfone;
4,4'-diaminodiphenyl ether (commonly named 4,4'-oxydianiline);
1,5-diaminonaphthalene;
3,3-dimethylbenzidine;
3,3-dimethoxybenzidine;
2,4-bis(beta-amino-t-butyl-)toluene;
bis(p-beta-amino-t-butvl-phenyl)ether;
bis(p-beta-methyl-o-aminophenyl)benzene;
1,3-diamino-4-isopropylbenzene;
1,2-bis(3-aminopropoxy)ethane;
benzidine;
m-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropoylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine; and mixtures of such diamines.

Preferred amine-terminated organosiloxanes suitable for use in preparing polyetherimide siloxane copolymers are those in which n and m independently range from 1 to about 5 and g ranges from about 5 to about 25. Particularly preferred amine-terminated organosiloxanes are those in which n and m are each 3, and which have a molecular weight distribution such that g has an average value ranging from about 9 to about 20.

The two amine compounds, namely, the organic diamine and the amine-terminated organosiloxane, may be physically mixed prior to reaction with the bis(ether anhydride)(s), thus forming a substantially random copolymer. Alternatively, block or alternating copolymers may be formed by forming prepolymers or sequential addition of reactants, as is well-known in the polymer art.

The amine-derived components of the polyetherimide siloxane copolymers generally contain from about 20 to 50 mole percent of the amine-terminated organosiloxane and from about 50 to 80 mole percent of the organic diamine. In preferred copolymers, the amine-derived components contain from about 25 to about 40 mole percent, most preferably about 35 mole percent of the amine-terminated organosiloxane.

The polyetherimide siloxane copolymer included in the blend compositions of the present invention may further contain repeating units of the formula

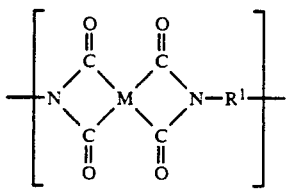

wherein R$^1$ is as previously defined and M is selected from the group consisting of

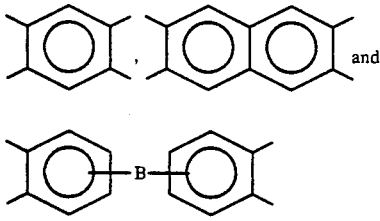

wherein B is —S— or

Blend compositions according to the present invention comprising the polyphenylene ether resin, or a mixture of polyphenylene ether resins, a polyetherimide siloxane copolymer and pentaerythritol tetrabenzoate preferably include the polyetherimide siloxane copolymer in an amount sufficient to improve the flame retardant properties of the blend compositions. Additionally, the blend compositions preferably include the pentaerythritol tetrabenzoate in an amount sufficient to lower the melt viscosity of the blend compositions. In a preferred embodiment, the compositions comprise from about 50 to about 95 weight percent of the polyphenylene ether resin or resins, from about 0.1 to about 25 weight percent of the polyetherimide siloxane copolymer, and from about 1 to about 25 weight percent of the pentaerythritol tetrabenzoate, based on these three components. More preferably, the compositions comprise from about 75 to about 95 weight percent of the polyphenylene ether resin or resins, from 1 to about 10 weight percent of the polyetherimide siloxane copolymer, and from about 5 to about 15 weight percent of the pentaerythritol tetrabenzoate.

In a preferred embodiment of the blend compositions of the present invention, an impact modifying rubber compound is included therein. Various synthetic and natural rubber materials known in the art may be included in the compositions. A preferred impact-modifying rubber compound for use in the compositions in the present invention comprises a block copolymer of a vinyl aromatic hydrocarbon and an alkene or a post-hydrogenated diene hydrocarbon. Generally, the block copolymers may be represented by the formula A-B-A wherein the terminal blocks A, which may be the same or different, are thermoplastic homopolymers or copolymers prepared from a vinyl aromatic compound. Examples of the vinyl aromatic compound include, but are not limited to, styrene, alpha-methylstyrene, vinyl toluene, vinyl xylene, ethylvinyl xylene, vinyl naphthalene and the like, or mixtures thereof. The center block B comprises an elastomeric polymer derived from alkene hydrocarbons such as ethylene and butylene, conjugated dienes and the like or mixtures thereof. The center block B comprises an elastomeric polymer derived from alkene hydrocarbons such as ethylene and butylene, conjugated dienes and the like or mixtures thereof.

Preferably, the block copolymers are subjected to a hydrogenation process whereby the unsaturated rubber block portion B of the copolymer is hydrogenated. Hydrogenation may be accomplished using conventional hydrogenation catalysts and reaction conditions. In the hydrogenated block copolymers, the terminal blocks A may have an average molecular weight of from about 4,000 to about 115,000 while the center blocks B have an average molecular weight of from about 20,000 to about 450,000. Hydrogenated block copolymers are specifically described in the Jones U.S. Pat. No. 3,431,323 and the DeLaMare et al U.S. Pat. No. 3,670,054, both of which are incorporated herein by reference. Particularly preferred block copolymers for use in the present invention comprise hydrogenated styrene-butadiene-styrene (styrene-ethylene-butylene-styrene) block copolymers and hydrogenated styrene-isoprene-styrene block copolymers.

When the blend compositions of the invention include the impact-modifying compound, for example, the block copolymer as discussed above, it is preferred that the compositions comprise from about 50 to about 95 weight percent of the polyphenylene ether resin, from about 0.1 to about 10 weight percent of the polyetherimide siloxane copolymer, from about 1 to about 25 weight percent pentaerythritol tetrabenzoate, and from about 1 to about 40 weight percent of the block copolymer, based on these four components. More preferably, the blend compositions comprise from about 75 to about 95 weight percent of the polyphenylene ether resin, from about 0.5 to about 5 weight percent of the polyetherimide siloxane copolymer, from about 5 to about 15 weight percent of pentaerythritol tetrabenzoate and from about 1 to about 20 weight percent of the block copolymer.

The blend compositions according to the present invention may be prepared using various blending techniques known in the art. In a preferred embodiment, the blends are melt extruded into a form suitable for further processing, for example, into pellets suitable for molding by means known in the art for solid thermoplastic compositions.

The blend compositions of the present invention may further include one or more additional thermoplastic polymer components and/or one or more conventional additives including, but not limited to, stabilizers, lubricants, antioxidants, colorants, fillers, plasticizers, antistatic agents, additional impact modifiers, and the like, in a manner well known in the art.

The blend compositions of the present invention are further illustrated by the following examples. Unless otherwise indicated, the parts and percentages employed in the examples are by weight.

EXAMPLE 1

In this example, compositions A-D were prepared according to the present invention. Specifically, composition A contained a polyphenylene ether resin (PPE), having an intrinsic viscosity of 0.40 dl/g in chloroform at 25° C., a polyetherimide siloxane copolymer (P/S copolymer), and pentaerythritol tetrabenzoate (PETB) supplied under the tradename Benzoflex® S552 supplied by Velsicol. The polyetherimide siloxane material was a copolymer of polyetherimide and gamma-aminopropyl functionalized polydimethyl siloxane. Compositions B-D further included a styrene-ethylene-butylene-styrene block copolymer comprising Krafton® G1651 supplied by Shell. The parts by weight of the components included in each of these compositions are set forth in Table I. The blend compositions were extruded on a 30mm Werner-Pfleiderer twin-screw extruder using a set temperature of approximately 600° F. and 10-20 inches Hg vacuum and were molded on a four ounce Newbury injection molding machine using a set temperature of approximately 600° F. and a mold temperature of approximately 200° F. All of compositions A-D were subjected to flammability testing in accordance with Underwriters Laboratories Bulletin 94 Procedures (UL 94). Specifically, the average flameout time (FOT) and maximum FOT were measured (in seconds) and the UL 94 rating was assigned. Both ⅛inch samples (⅜inch x ½inch 33 2.5 inch) and 1/16 inch samples (1/16 inch x ½inch ×5 inch) were evaluated. The capillary melt viscosity at 600° F., 3,000 sec$^{-1}$ of the samples was also evaluated. Samples of the compositions were also subjected to measurement of notched Izod impact strength according to ASTM-D256 (employing a sample size of ⅛inch ×½inch ×2.5 inch), Dynatup (automated falling dart energy-to-fracture) strength according to ASTM-D3763 (using a ⅛inch ×4 inch disc) and tensile yield strength and tensile elongation-at-break according to ASTM-D638. The results of these measurements are also set forth in Table I.

TABLE I

| | COMPOSITION | | | |
|---|---|---|---|---|
| | A | B | C | D |
| PPE, pbw | 90 | 90 | 90 | 90 |
| P/S Copolymer, pbw | 2 | 2 | 2 | 2 |
| PETB, pbw | 10 | 10 | 10 | 10 |
| SEBS Block, pbw | — | 4 | 7.5 | 8 |
| UL 94 Ratings ⅛" specimen | | | | |
| FOT, sec | | | | |
| avg. | 1.4 | 1.1 | 1.5 | 1.5 |
| max. | 3 | 3 | 3 | 4 |
| Rating | V-O | V-O | V-O | V-O |
| 1/16" specimen FOT, sec | | | | |
| avg. | 2.2 | 2.6 | 2.1 | 1.9 |
| max. | 6 | 5 | 6 | 5 |
| Rating | V-O | V-O | V-O | V-O |
| Melt Viscosity, poise 600° F., 3000 sec$^{-1}$ | 970 | 1160 | 1110 | 1070 |
| Izod Impact, ft-lb/in | | | | |
| Room temperature | 0.6 | 3.8 | 6.2 | 7.6 |
| −20° F. | — | 2.0 | — | 4.2 |
| Dynatup, ft-lb | | | | |
| Room temperature | 3 | 38 | 43 | 36 |
| −20° F. | — | 9 | — | 21 |
| Tensile Properties | | | | |
| Yield strength, psi | 12180 | 10610 | 9730 | 9430 |
| Elongation, % | 23 | 16 | 26 | 20 |

The results set forth in Table I demonstrate that the compositions according to the present invention, A-D, exhibited both good flame retardant properties and lowered melt viscosity. Additionally, a comparison of compositions B-D with composition A demonstrates that the block copolymer provided significantly improved impact strength to the compositions without impairing the flame retardant properties.

COMPARATIVE EXAMPLE 1

In this example, comparative compositions E-G were prepared comprising a polyphenylene ether resin, a polyetherimide siloxane copolymer and a styrene-ethylene-butylene-styrene block copolymer as were employed in compositions A-D. However, comparative compositions E-G did not include the pentaerythritol tetrabenzoate which was included in compositions A-D. Comparative compositions E-G were extruded and molded according to the general procedures described in Example 1 using an extrusion melt temperature in the range of 653 to 668° F., seven inches Hg vacuum, a melt injection temperature in the range of 652 to 662° F. and a mold temperature of 200° F. Samples of comparative compositions E-G were also subjected to flammability performance tests and measurement of melt viscosity, Izod impact, Dynatup strength and tensile properties in accordance with the procedures set forth in Example 1. The parts by weight of the components included in comparative compositions E-G and the results of these tests and measurements are set forth in Table IA.

TABLE IA

| | Composition | | |
|---|---|---|---|
| | E | F | G |
| PPE, pbw | 93 | 90.5 | 88 |
| P/S Copolymer pbw | 2 | 2 | 2 |
| SEBS Block, pbw | 5 | 7.5 | 10 |
| UL 94 Ratings ⅛" specimen | | | |

TABLE IA-continued

| | Composition | | |
|---|---|---|---|
| | E | F | G |
| FOT, sec | | | |
| avg. | 2.2 | 2.1 | 2.8 |
| max. | 5 | 3 | 7 |
| Rating | V-O | V-O | V-O |
| 1/16" specimen | | | |
| FOT, sec | | | |
| avg. | 1.7 | 2.4 | 2.2 |
| max. | 4 | 4 | 4 |
| Rating | V-O | V-O | V-O |
| Melt Viscosity, poise 600° F., 3000 sec$^{-1}$ | 2030 | 1950 | 1870 |
| Izod Impact, ft-lb/in | | | |
| Room temperature | 2.6 | 6.1 | 7.1 |
| −20° F. | 1.5 | 2.0 | 3.6 |
| Dynatup, ft-lb | | | |
| Room temperature | 37 | 40 | 35 |
| −20° F. | 16 | 26 | 31 |
| Tensile Properties | | | |
| Yield strength, psi | 10080 | 9570 | 9160 |
| Elongation, % | 36 | 44 | 31 |

A comparison of the results set forth in Table I and Table IA demonstrate that the compositions according to the present invention exhibit improved melt viscosity while retaining good flame retardant properties.

The preceding examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. A blend composition, comprising:
    (a) a polyphenylene ether resin;
    (b) a polyetherimide siloxane copolymer; and
    (c) pentaerythritol tetrabenzoate,
wherein the polyetherimide siloxane copolymer is included in an amount sufficient to improve the flame retardant properties of the blend composition and the pentaerythritol tetrabenzoate is included in an amount sufficient to lower the melt viscosity of the blend composition.

2. A blend composition as defined by claim 1, wherein the polyphenylene ether resin is selected from the group consisting of poly(2,6-dimethyl-1,4-phenylene) ether, poly(2,3,6-trimethyl-1,4-phenylene) ether, a copolymer which includes units of 2,6-dimethyl-1,4-phenylene ether and units of 2,3,6-trimethyl-1,4-phenylene ether, and a blend of poly(2,6-dimethyl-1,4-phenylene) ether and poly(2,3,6-trimethyl-1,4-phenylene) ether.

3. A blend composition as defined by claim 1, wherein the polyetherimide siloxane copolymer contains repeating units of the formula

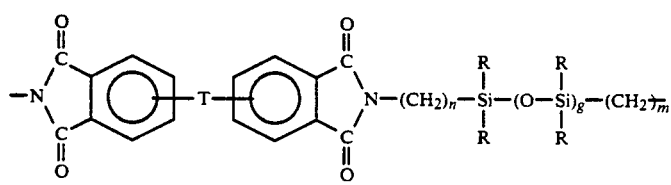

and of the formula

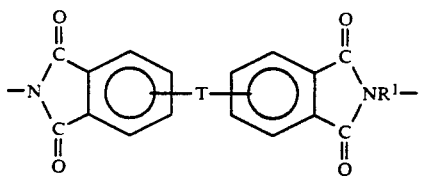

wherein T is —O— or a group of the formula —O—Z—O wherein the divalent bonds of the —O— or the —O—Z—O group are in the 3,3'; 3,4'; 4,3', or the 4,4' positions; Z is a divalent radical selected from the group consisting of

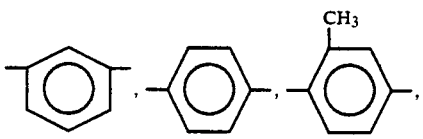

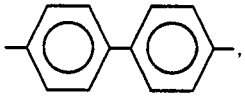

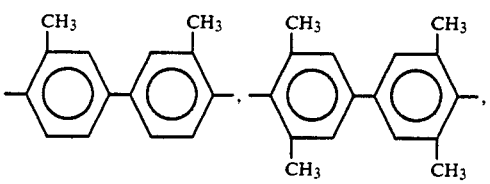

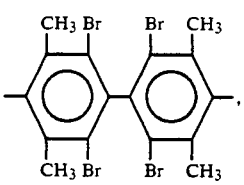

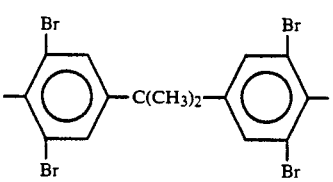

and

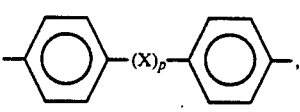

wherein X is a member selected from the group consisting of divalent radicals of the formulas

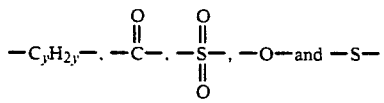

wherein y is an integer from 1 to about 5, and p is 0 or 1; n and m independently are integers from 1 to about 10; g is an integer from 1 to about 40; R is a $C_1$-$C_{14}$ monovalent hydrocarbon radical; and $R^1$ is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloaklylene radicals having from 3 to about 20 carbon atoms, and (c) divalent radicals of the general formula

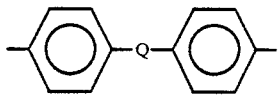

where Q is a member selected from the group consisting of

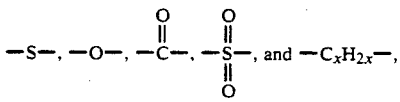

and x is an integer from 1 to about 5.

4. A blend composition as defined by claim 3, wherein in formula (I), R is a methyl group.

5. A blend composition as defined by claim 4, wherein n and m are each 3.

6. A blend composition as defined by claim 3, wherein the polyetherimide siloxane copolymer further contains repeating units of the formula

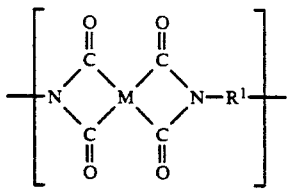

wherein $R^1$ is as previously defined and M is selected from the group consisting of

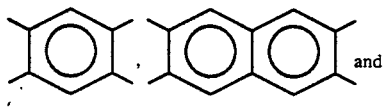

-continued

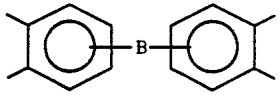

wherein B is —S— or

7. A blend composition as defined by claim 1, further including (d) a block copolymer of a vinyl aromatic hydrocarbon and an alkene or a post-hydrogenated diene hydrocarbon.

8. A blend composition as defined by claim 7, wherein the block copolymer is included in an amount sufficient to improve the impact strength of the blend composition.

9. A blend composition as defined by claim 7, comprising
  (a) from about 50 to about 95 weight percent of the polyphenylene ether resin;
  (b) from about 0.1 to about 10 weight percent of the polyetherimide siloxane copolymer;
  (c) from about 1 to about 25 weight percent of pentaerythritol tetrabenzoate; and
  (d) from about 1 to about 40 weight percent of the block copolymer.

10. A blend composition as defined by claim 9 comprising
  (a) from about 75 to about 95 weight percent of the polyphenylene ether resin;
  (b) from about 0.5 to about 5 weight percent of the polyetherimide siloxane copolymer;
  (c) from about 5 to about 15 weight percent of pentaerythritol tetrabenzoate; and
  (d) from about 1 to about 20 weight percent of the block polymer.

11. A blend composition as defined by claim 7, wherein the block copolymer comprises a hydrogenated styrene-butadiene-styrene block copolymer.

12. A blend composition as defined by claim 7, wherein the block copolymer comprises a hydrogenated styrene-isoprene-styrene block copolymer.

13. A blend composition as defined by claim 1, further including at least one additive selected from the group consisting of stabilizers, lubricants, antioxidants, colorants, fillers, plasticizers and antistatic agents.

14. A blend composition, comprising
  (a) from about 50 to about 95 weight percent of a polyphenylene ether resin;
  (b) from about 0.1 to about 25 weight percent of a polyetherimide siloxane copolymer; and
  (c) from about 1 to about 25 weight percent of pentaerythritol tetrabenzoate.

15. A blend composition, comprising
  (a) from about 75 to about 95 weight percent of a polyphenylene ether resin;
  (b) from about 1 to about 10 weight percent of a polyetherimide siloxane copolymer; and
  (c) from about 5 to about 15 weight percent of pentaerythritol tetrabenzoate.

* * * * *